United States Patent [19]

Gralnick

[11] Patent Number: 4,914,733
[45] Date of Patent: Apr. 3, 1990

[54] TRAFFIC ADVISORY-INSTANTANEOUS VERTICAL SPEED DISPLAY

[75] Inventor: Paul E. L. Gralnick, Coral Springs, Fla.

[73] Assignee: Allied-Signal, Inc., Morris Township, Morris County, N.J.

[21] Appl. No.: 115,687

[22] Filed: Oct. 30, 1987

[51] Int. Cl.$^4$ .................................................. G08G 5/04
[52] U.S. Cl. ..................................... 340/961; 342/29; 342/458; 364/461
[58] Field of Search ................ 340/961, 963, 973, 969, 340/970, 977, 978; 364/439, 460, 461, 449, 440, 441; 342/29–32, 37, 38, 455

[56] References Cited

U.S. PATENT DOCUMENTS

| | | |
|---|---|---|
| 3,310,806 | 3/1967 | Stansbury . |
| 3,573,818 | 4/1971 | Lennon, Jr. et al. .................. 342/29 |
| 3,614,728 | 10/1971 | Borrok et al. ......................... 340/961 |
| 3,621,210 | 11/1971 | Canning et al. ...................... 340/961 |
| 3,750,166 | 7/1973 | Dearth . |
| 4,167,006 | 9/1979 | Funatsu et al. ....................... 364/461 |
| 4,196,474 | 4/1980 | Buchanan et al. ................... 364/440 |

FOREIGN PATENT DOCUMENTS

| | | |
|---|---|---|
| 2652489 | 5/1978 | Fed. Rep. of Germany . |
| 87/01209 | 2/1987 | World Int. Prop. O. . |

OTHER PUBLICATIONS

"Systémes d'anticollision Air—Air", 8057 L'Onde Electrique, vol. 62, (1982), Jun.-Jul., No. 6/7, pp. 72-82.

"Automatic Traffic Advisory and Resolution Service", (ATARS), 8080 Wescon Conference, vol. 24, Sep. 16-18, 1980, pp. 1-10.

"Bendix/King TCAS II" Brochure.

"Traffic Alert and Collision Avoidance System", RTCA/DO-185, 9-23-85, pp. 1-20.

"The Promise of Air Safety", IEEE Spectrum, Jul. 1975, Marc Eleccion, pp. 26-36.

TCAS III Display, IEEE Spectrum, Nov. 1986, p. 47.

"Discrete Address Beacon System Sensor", Robert Lockerd, Naecon '77, Record 713-722.

"At the Crossroads in Air-Traffic Control", Gordon Friedlander, IEEE Spectrum, Jul. 1970, pp. 69-83.

Primary Examiner—Joseph A. Orsino
Assistant Examiner—Brent A. Swarthout
Attorney, Agent, or Firm—Howard G. Massung

[57] ABSTRACT

An electronic display for presenting to an aircraft flight crew the combined information outputs of a vertical speed sensor and a TCAS computer aboard an aircraft. TCAS traffic advisories, i.e. the locations of other aircraft in the vicinity of the protected aircraft, are presented in a first display area of an electric display panel, preferably in PPI format, showing range, relative bearing and relative altitude, if known. Vertical speed of the protected aircraft is indicated in a second display area adjacent the first display area on the same display panel. Whenever the TCAS computer determines that a particular aircraft constitutes a collison threat and that the establishment or maintainence of a specific flight path is necessary to minimize the probability of collision, the TCAS computer issues a resolution advisory which is displayed by identifying the threatening aircraft with a characterizing symbol in the first display area and by indicating symbolically and by other distinctive visual means, such as contrasting colors, in the first and second display areas the specific flight path to be established or maintained.

17 Claims, 3 Drawing Sheets

TRAFFIC ADVISORY-INSTANTANEOUS VERTICAL SPEED DISPLAY

The present invention relates to aircraft pilotage instruments. More particularly, it relates to an instrument for presenting to an aircraft pilot upon a single display panel combined information relating to the instantaneous vertical speed of the aircraft and traffic advisories derived from the Traffic Alert and Collision Avoidance System (TCAS).

BACKGROUND OF THE INVENTION

Until the present, an aircraft pilot was dependent upon visual contact with an approaching aircraft and upon voice advisories from ground based traffic controllers to avoid mid-air collision with another aircraft There is currently being implemented a Traffic Alert and Collision Avoidance System (TCAS) which will enable a lone aircraft to develop a panoramic display of surrounding aircraft equipped with Air Traffic Control Radar Beacon System (ATCRBS) transponders.

Document RTCA/DO-185 "Minimum Operational Performance Standards for Traffic Alert and Collision Avoidance System", published September, 1983, by the Radio Technical Commission for Aeronautics, Washington, D.C., 20005 broadly describes TCAS in the following terms:

TCAS is most readily understood by visualizing its operation in flight. When airborne, the TCAS equipment periodically transmits interrogation signals. These interrogations are received by Air Traffic Control Radar Beacon System (ATCRBS) or Mode S altitude reporting transponders. In reply to the interrogations, the transponder transmits a signal which reports its altitude. The TCAS equipment computes the range of the intruding aircraft by using the round-trip time between the transmission of the interrogation and the receipt of the reply.

Altitude, altitude rate, range and range rate are determined by tracking the reply information. These data, together with the current TCAS sensitivity level (which specifies the protected volume around the aircraft) are used to determine whether the intruding aircraft is a threat. Each threat aircraft is processed individually to permit selection of the minimum safe resolution advisory based on track data and coordination with other TCAS-equipped aircraft If the threat detection logic in the TCAS computer determines that a proximate aircraft represents a potential collision or near-miss encounter, the computer threat resolution logic determines the appropriate vertical maneuver that will ensure the safe separation of the TCAS aircraft. The appropriate maneuver is one that ensures adequate vertical separation while causing the least deviation of the TCAS aircraft from its current vertical rate.

The resolution advisories displayed to the pilot can be divided into two categories: Corrective advisories, which instruct the pilot to deviate from the current flight path (e.g. DON'T CLIMB when the aircraft is climbing); and preventive advisories (e.g. DON'T CLIMB when the aircraft is in level flight).

The traffic advisories displayed to the pilot describe the positions of proximate aircraft that are, or could become, collision threats. The display of traffic advisories alerts the flight crew to the presence of threat, or potential threat aircraft, and may improve the ability of the crew to respond to subsequent resolution advisories. In addition, traffic advisories may improve the ability of the flight crew to visually acquire the traffic.

The referenced DO-185 standard provides that the following information shall be displayed to the flight crew. The means for displaying such information are not specified.

a. Resolution Advisories:
CLIMB
DESCEND
DON'T CLIMB
DON'T DESCEND
DON'T CLIMB FASTER THAN 500 FPM
DON'T CLIMB FASTER THAN 1000 FPM
DON'T CLIMB FASTER THAN 2000 FPM
DON'T DESCEND FASTER THAN 500 FPM
DON'T DESCEND FASTER THAN 1000 FPM
DON'T DESCEND FASTER THAN 2000 FPM b. Failure of own TCAS equipment c. TCAS equipment inhibited—either automatically or through crew action d. Encounter situation worsened beyond limits of resolution by TCAS equipment.

In addition to the information specified in Paragraphs a–d above, display of traffic advisories for at least three targets including range, altitude and bearing of intruding aircraft is required.

It is vital that the information provided by TCAS be presented to the flight crew in the most effective manner to ensure prompt and correct reaction by the crew. At present, TCAS traffic advisories, together with the resolution advisories CLIMB, DESCEND, DON'T CLIMB, DON'T DESCEND are displayed on a cathode ray tube (CRT) which may be either dedicated to TCAS display or shared for the display of information from sources other than TCAS, such as weather radar.

The remaining TCAS resolution advisories DON'T CLIMB FASTER THAN 500 FPM, DON'T DESCEND FASTER THAN 500 FPM, etc. are displayed on the Instantaneous Vertical Speed Indicator (IVSI). The IVSI is a standard flight instrument which combines the output of a barometric altitude rate sensor with the integrated output of a vertical accelerometer. Data from the vertical accelerometer compensates for the time lag in the data from the barometric rate sensor.

In its most common form the rate of climb or descent of the aircraft sensed by the IVSI is indicated by the position of a pointer on a circular scale. In a less common form, the altitude rate is indicated by the position of a pointer along a linear scale.

Those TCAS resolution advisories requiring the aircraft to climb or descend at a limited rate are displayed on the IVSI by illuminating with red light the portion of the background of the IVSI indicator scale at which rates the aircraft flight path is not to be changed. For example, if the TCAS resolution advisory is DON'T CLIMB FASTER THAN 1000 FPM, the background of the IVSI indicator climb scale for rates of 1000 FPM and greater is illuminated red while the climb scale for rates from zero to 1000 FPM and the descent scale for all rates continue to be illuminated normally. Such a display of TCAS resolution advisories creates the possibility that the flight crew may not interpret the advisory as a positive command to alter flight course immediately or that the crew may misinterpret the advisory and react in an incorrect manner. Further, since the present means of displaying TCAS resolution advisories involves separate displays for certain of the advisories, the crew must first focus attention on the area of the instrument panel containing the traffic advisory display, then refocus attention on the area of the instrument panel containing the IVSI display. The necessity for thus shifting attention to obtain a complete TCAS resolution advisory creates the possibility that some event may divert the crew's attention long enough to delay reaction to the advisory beyond the time during which proper reaction would resolve the collision threat.

It is an object of the invention to provide means for displaying in a single unit all traffic advisories and resolution advisories generated for display by TCAS.

It is another object of the invention to provide a unitary display for TCAS traffic advisories and resolution advisories in which the information is presented in an unambiguous and readily comprehensible manner.

It is a further object of the invention to provide a unitary display for TCAS traffic advisories and resolution advisories in which the information is presented symbollically to the maximum extent possible.

SUMMARY OF THE INVENTION

Briefly, the invention comprises a display device of either a color CRT or flat panel type upon which is presented the combined information output of the aircraft IVSI system and the traffic advisories and resolution advisories generated by the TCAS computer for display. TCAS traffic advisories are shown by the positions of intruder aircraft characterizing symbols upon a defined field. In the preferred embodiment, the display is in a PPI format. The center of the display field represents own aircraft position and the intruder aircraft symbols are located at positions on the field representative of the relative bearing and range to the intruding aircraft. The intruding aircraft symbols characterize the intruder as a non-threatening aircraft, a potentially threatening aircraft or a threatening aircraft requiring crew action to avoid a possible collision. The appearance of a threatening aircraft results in the issuance of a resolution advisory.

The aircraft rate of change of altitude sensed by the IVSI is displayed by the position of a pointer on an altitude rate scale. In the preferred embodiment of the invention, the altitude rate scale is circular, laid out along the outer periphery of the TCAS display field.

Resolution advisories are displayed symbolically by one or more of the following means: a vertical arrow directed up or down, depending on whether the resolution advisory is CLIMB or DESCEND; a vertical arrow directed up or down upon which the international DON'T symbol is superimposed, i.e. a red circle crossed by a red diagonal bar, depending on whether the resolution advisory is DON'T CLIMB or DON'T DESCEND; and coloration of the background of relevant segments of the IVSI altitude rate scale by one of three contasting colors, preferably red, green and yellow, according to the particular resolution advisory and current vertical speed of the aircraft.

DETAILED DESCRIPTION

Figure 1B:
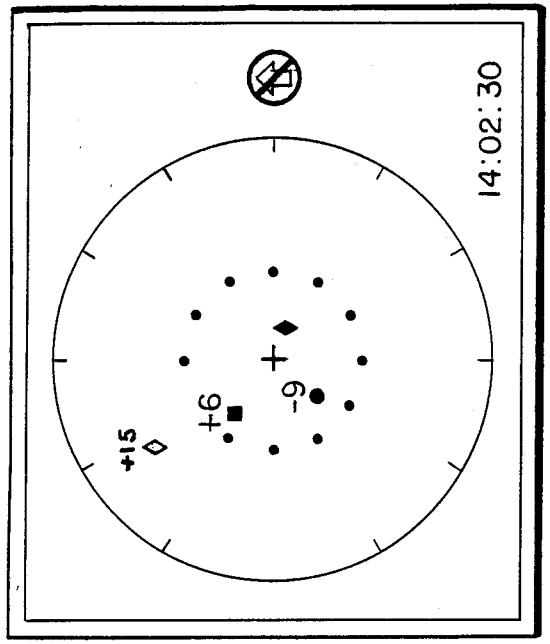
FIG. 1B is an elevation of a prior art display of traffic advisories and certain resolution advisories presented in a PPI format.
Figure 1A:
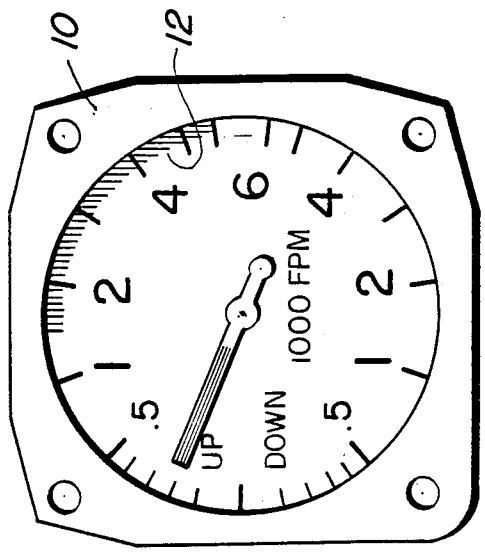
FIG. 1 is an elevation of an Instantaneous Vertical Speed Indicator (IVSI) modified in accordance with the prior art to display certain resolution advisories.

FIGS. 1A and 1B illustrate the TCAS display of the prior art. FIG. 1B shows a plan position indicator (PPI) of either a flat panel or CRT type upon which traffic advisories and certain of the resolution advisories are displayed. FIG. 1A shows a conventional IVSI modified to display resolution advisories not displayed on the PPI of FIG. 1B. Modification of the IVSI involves the installation of a plurality of light emitting diodes about the periphery of the indicator scale which may be selectively energized to illuminate relevant segments of the scale with light of a color contrasting to the normal instrument illumination. For example, if the indicator is normally illuminated with white light, the LEDs preferably emit red light. Although FIGS. 1A and 1B are shown adjacent to one another, in the usual installation the TCAS PPI display and the IVSI are located in different areas of the aircraft instrument panel out of the same direct field view.

Table 1 is explanatory of the symbols used in the display of FIG. 1B and FIGS. 2A through 2C. The explanation associated with each symbol is not shown at any time on the TCAS display.

TABLE 1

| |
|---|
| ● - O'CLOCK POSITIONS AT 4NM |
| ◇ - NON-THREATENING TARGET |
| ◆ - NON-ALTITUDE REPORTING TARGET |
| ● - TRAFFIC ADVISORY |
| ■ - RESOLUTION ADVISORY |
| + - OWN AIRCRAFT |

FIG. 1B shows a traffic situation in which four intruding aircraft are located within ten nautical miles of one's own aircraft. Own aircraft is represented by a cross at the center of the field heading toward the 12 o'clock position The display range is set at ten nautical miles but may be selected as 3, 5, 10 or 20 nautical miles.

The target aircraft displayed at a relative bearing of approximately 345° and a range of about 7 NM is characterized by the open diamond symbol as a non-threatening target. The number +15 adjacent thereto indicates that the altitude of that target relative to the altitude of own aircraft is 1500 feet above.

The target aircraft displayed at a relative bearing of approximately 220°, range of approximately 3 NM and relative altitude of −900 feet above is characterized by the solid circle symbol as a potential threat because the TCAS computer has projected that within 30 seconds it will pass within 1 NM of own aircraft at a relative altitude of ±1000 feet.

The target aircraft displayed at a relative bearing of approximately 120° and range of 1.5 NM is characterized by the solid diamond symbol as a non-altitude reporting target. Aircraft not equipped with altitude reporting ATCRBS transponders are displayed when they approach within 2 NM of own aircraft. A resolution is not given because the relative altitude thereof is not known. Whether such an aircraft constitutes a collision threat requires visual acquisition by the flight crew.

The target aircraft displayed at a relative bearing of approximately 350°, range of 3.5 NMI and relative altitude of 600 feet above own aircraft generates a resolution advisory characterized by the solid square as a collision threat. A resolution advisory is displayed for a target aircraft whenever TCAS determines that under present conditions that aircraft will be within 1000 feet of own aircraft 25 seconds later. The particular resolution advisory issued by TCAS is selected by the computer on the basis of the best action to be taken by the flight crew to minimize potential collisions in view of the total traffic situation.

In this case, the resolution advisory is DON'T CLIMB FASTER THAN 1500 FPM. However, those resolution advisories involving climb or descent at a limited rate are not displayed in their entirety on the prior art display of FIG. 1B. It is necessary for the flight crew to recognize that the DON'T CLIMB resolution advisory indicated by the crossed vertical arrow is not necessarily the complete resolution advisory. Upon the issuance of each resolution advisory, displayed as vertical arrow directed up or down, crossed or uncrossed, the crew must direct its attention away from the TCAS PPI to the IVSI to obtain the complete meaning of the resolution advisory displayed.

FIG. 1A shows the means for displaying the remainder of the resolution advisory issued by TCAS for the traffic situation shown in FIG. 1B. The information that climb is permitted so long as the climb rate does not exceed 1500 FPM is conveyed by energizing certain ones of light emitting diodes extending around the periphery of the indicator scale. The LEDs are concealed behind the bezel 10 of the indicator. The LEDs energized are those adjacent the "UP" scale for values from 1500 to 6000 FPM. The background of the indicator scale adjacent the energized LEDs is thus illuminated with red light as shown by the shaded portion 12 of the indicator scale. Of course, if the indicator is normally illuminated with red light instead of white light, LEDs capable of emitting light of a color contrasting with red are used.

The disadvantages associated with the prior art TCAS display of FIGS. 1A and 1B are evident. The resolution advisory given symbolically by the crossed vertical arrow is ambiguous, standing alone, since that symbol may be invoked whenever the resolution advisory is DON'T CLIMB, DON'T CLIMB FASTER THAN 500 FPM, DON'T CLIMB FASTER THAN 1000 FPM or DON'T CLIMB FASTER THAN 1500 FPM. A similar ambiguity exists whenever any of the DON'T DESCEND resolution advisories are issued.

In transferring attention from the TCAS traffic advisory display to the IVSI display to obtain the complete advisory, the response time of the flight crew to the advisory is inevitably increased to some extent. Also, within that interval, some distraction may occur which further prolongs or even prevents crew response to the advisory.

Figure 2C:
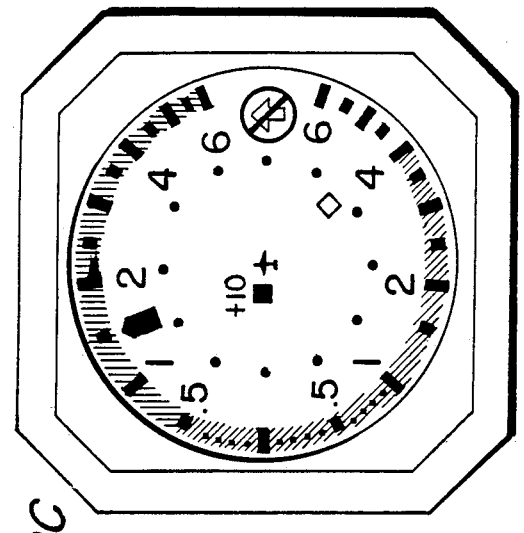
FIGS. 2A-2C are elevations of the preferred embodiment of the invention for several different traffic situations.
Figure 2B:
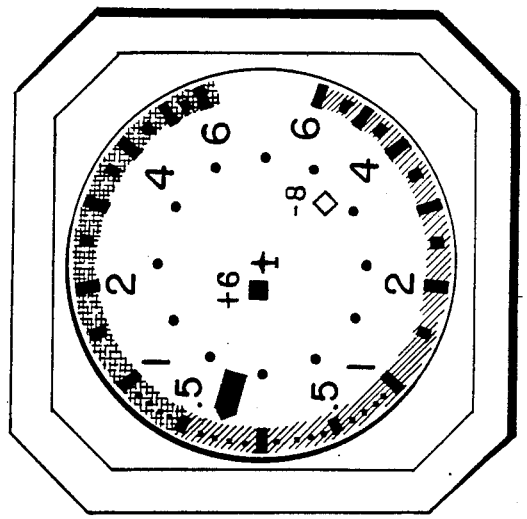
Figure 2A:
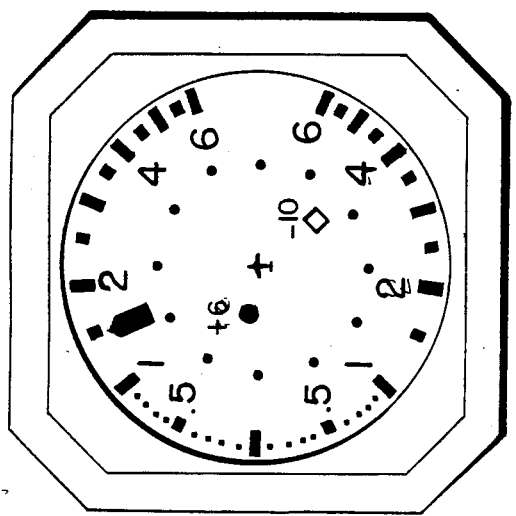

The improved TCAS display of the invention is shown in FIGS. 2A-2C. The IVSI and the TCAS traffic advisory are integrated in a single display panel of either the color flat panel or color CRT type. Referring to FIG. 2A, the IVSI scale is laid out circularly about the outer periphery of a PPI display field. Own aircraft climb or descent status is shown by the position of the pointer along the IVSI scale.

TCAS traffic advisories are shown by the target aircraft symbols defined in FIG. 1C located at relevant positions on the PPI field. Own aircraft position is represented by the aircraft symbol at the center of the field headed toward the 12 O'clock position. In the traffic situation of FIG. 2A, a target aircraft located at a relative bearing of approximately 280°, range of 2 NM and relative altitude of +600 feet is shown as a traffic advisory represented by a solid yellow circle. Another target aircraft at a relative bearing of approximately 135°, range of 3.5 NMI and relative altitude of −1000 feet is shown as a non-threatening target represented by a white diamond outline. TCAS has determined that no change in own aircraft flight path is required to resolve the situation and no resolution advisory is issued. In such a case, the IVSI scale is represented by white numerals and scale graduations on a dark background.

FIG. 2B shows a traffic situation involving the resolution advisory DON'T CLIMB FASTER THAN 500 FPM. The target aircraft located at a relative bearing of approximately 280°, range of 0.5 NMI and relative altitude of +600 feet is shown as a resolution advisory represented by a red square. The complete resolution advisory is displayed symbolically on the integrated IVSI-TCAS display by altering the background coloration of the IVSI scale and by the use of appropriate crossed or uncrossed vertical arrows.

In the situation of FIG. 2B, vertical maneuver of one's own aircraft will resolve the threatened collision provided the vertical maneuver does not involve climbing at a rate faster than 500 FPM. The resolution advisory is given by showing the IVSI scale divisions as black marks on a yellow background for scale values from +500 to +6000 FPM and as black marks on a green background for scale values from +500 to −6000 FPM.

FIG. 2C shows a traffic situation involving the resolution advisory DON'T CLIMB. The target aircraft located at a relative bearing of approximately 280°, range of 0.5 NMI and relative altitude of +1000 feet poses a definite threat of collision unless the present flight path of one's own aircraft is altered. Presently, own aircraft is climbing at 1500 FPM. The DON'T CLIMB resolution advisory is given by displaying a white arrow pointing up with the DON'T symbol of a red circle and diagonal cross superimposed and by displaying the IVSI scale division markings as black marks on a red background for values from +500 to +6000 FPM and as black marks on a green background for values from +500 to −6000 FPM.

In a traffic situation involving the resolution advisory CLIMB, the resolution advisory would be displayed in a manner similar to FIG. 2C except that the DON'T symbol would not be superimposed on the vertical arrow and except that the background of the IVSI scale extending from −500 to −6000 FPM would be colored red. Traffic situations involving the resolution advisories DESCEND and DON'T DESCEND are displayed in a manner similar to FIG. 2C by a downward pointed arrow with or without the DON'T symbol superimposed and by red and green coloration of the backgrounds of appropriate portions of the IVSI scale.

Traffic situations involving resolution advisories permitting climb or descent at a limited rate, such as DON'T DESCEND FASTER THAN 500 FPM are displayed in a manner similar to FIG. 2B with green and yellow coloration of the backgrounds of appropriate portions of the indicator scale.

The advantages of the integrated IVSI-TCAS traffic advisory display of the invention are evident. Complete information of TCAS resolution advisories is presented to the flight crew symbolically without need to resort to written commands or need to divide attention between different areas of the aircraft instrument panel. Thus, more rapid response to resolution advisories is assured and less opportunity exists for the crew to be distracted from execution of the commands.

Figure 3:
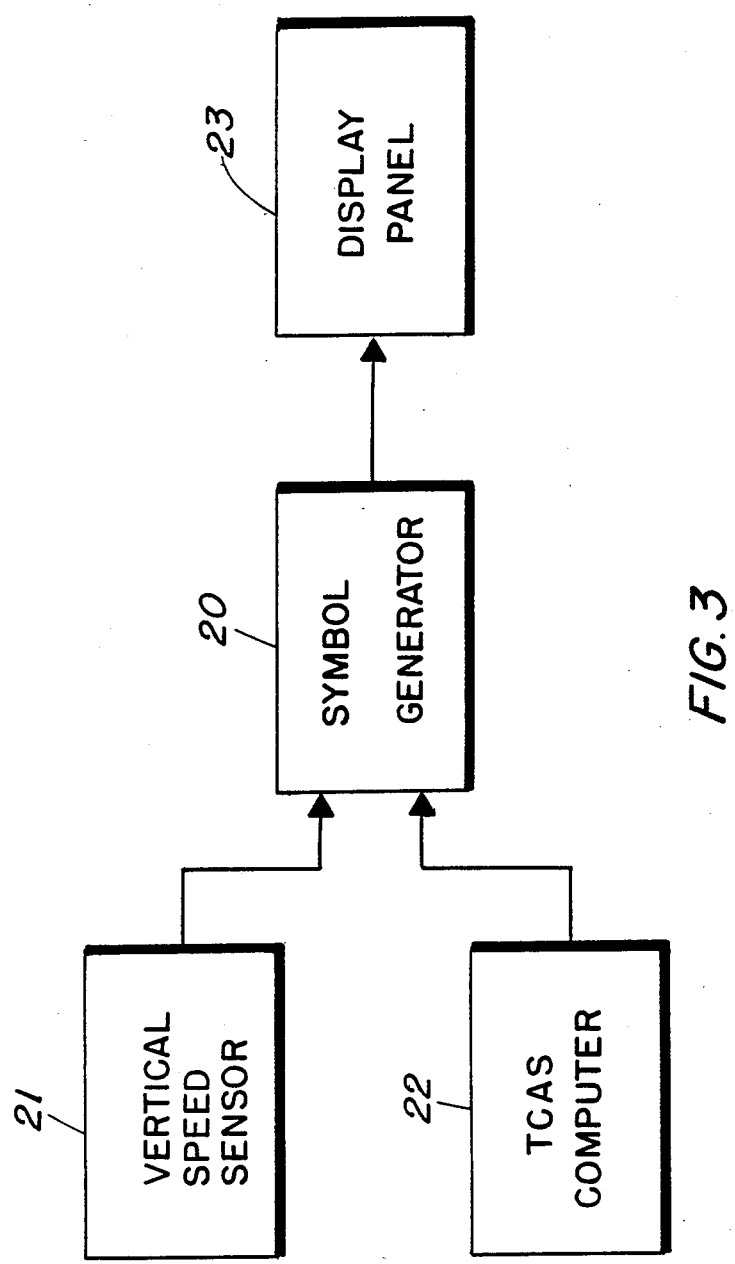
FIG. 3 is a simplified functional block diagram of the means for generating the displays of FIGS. 2A-2C.

FIG. 3 shows the means for generating the displays of FIGS. 2A-2C, which are known to those skilled in the art. A symbol generator 20 receives the output data from the aircraft instantaneous vertical speed sensor 21 and from the aircraft TCAS computer 22. Generator 20 develops luminance, chrominance and location signals for controlling the illumination of selected areas of an electronic display panel 22 which may be of the color flat panel type or the color CRT type. Data from the vertical speed sensor 21 is utilized by generator 20 to develop signals for locating the pointer of the IVSI at the appropriate position along the indicator scale. Data from the TCAS computer 22 is utilized by generator 20 to develop location, luminance and chrominance signals for illuminating selected areas of the display 20 to create the TCAS PPI display with target aircraft properly positioned and symbolically characterized thereon. Generator 20 also utilizes data from the TCAS computer 21 for generating location, luminance and chrominance for illuminating appropriate portions of the IVSI scale with colored light in accordance with resolution advisories issued by the TCAS computer.

The invention may be practiced otherwise than as specifically described without departing from the spirit and scope of the appended claims. For example, the invention may be employed in monochromatic displays using means other than contrasting colors, such as cross-hatching, to distinguish prohibited from permissible rates of climb or descent on the IVSI scale. Also, the IVSI scale could be laid out as a linear instead of circular scale.

The invention claimed is:

1. A display for presenting symbolically to an aircraft flight crew the traffic advisory and resolution advisory information developed by a Traffic Advisory and Collision Avoidance System (TCAS) computer aboard an aircraft, comprising:
   an electronic display panel
   an instantaneous vertical speed sensor aboard the aircraft, said sensor providing output data containing rate of climb or descent information for the aircraft;
   first means receiving output data from said TCAS computer for controlling said display panel to present thereon a first display indicating the locations of other aircraft relative to the aircraft, said other aircraft being characterized by particular symbols in accordance with their degree of collision threat to the aircraft,
   second means receiving output data from said instantaneous vertical speed sensor for controlling said display panel to present thereon a second display indicating the vertical speed of the aircraft, said second display being located in an area of said panel adjacent said first display; and
   third means receiving output data from said TCAS computer for controlling said display panel to cause said second display to indicate vertical speeds of the aircraft which comply with a particular resolution advisory generated by said TCAS computer,
   said second display including a scale of climb and descent rates and a pointer, the information content of said sensory output data being indicated by the position of said pointer along said scale, said third means controlling said display panel to cause illumination of the backgrounds of different portions of said scale with light of contrasting colors in accordance with resolution advisories generated by said TCAS computer, wherein said first display is presented in PPI format and said second display is laid out about the outer periphery of said first display.

2. Apparatus as claimed in claim 1 wherein said display panel is of the color liquid crystal type.

3. Apparatus as claimed in claim 1 wherein said display panel is of the color cathode ray tube type.

4. Apparatus as claimed in claim 1 wherein said second display is laid out circularly about the outer periphery of said first display.

5. Apparatus as claimed in claim 1 wherein said background of said scale is illuminated with red light in the range of rates prohibited by a particular resolution advisory and is illuminated with green light in the range of rates permitted by said particular resolution advisory.

6. Apparatus as claimed in claim 1 wherein the portion of the background of the vertical speed scale covering climb or descent rates in excess of climb or descent rates permitted by a particular TCAS resolution advisory is illuminated with yellow light and the remaining portion of the background of the vertical scale in compliance with said particular TCAS resolution is illuminated by green light.

7. Apparatus as claimed in claim 1 wherein said third means controls said display means to selectively illuminate one or more portions of the background of said scale in accordance with a particular resolution advisory.

8. Apparatus as claimed in claim 7 wherein said portion of the background of said scale in the range of rates prohibited by said particular resolution advisory is illuminated with red light.

9. Apparatus as claimed in claim 8 wherein said portion of the background of said scale in the range of rates permitted by said resolution advisory is illuminated with green light.

10. Apparatus as claimed in claim 7 wherein the altitude of said other aircraft relative to the aircraft is displayed adjacent said particular symbols characterizing said other aircraft.

11. Apparatus as claimed in claim 1 further comprising: a third display on said display panel controlled by said first means receiving output data from said TCAS computer, on which a symbol representative of the resolution advisory generated by said TCAS is displayed.

12. Apparatus as claimed in claim 1 wherein the altitude of said other aircraft relative to the aircraft, is displayed adjacent said particular symbols characterizing said other aircraft.

13. Apparatus as claimed in claim 12 wherein said relative altitude is displayed in hundreds of feet as a positive number if said other aircraft is above the aircraft or as a negative number if said other aircraft is below the aircraft.

14. A method for presenting to a aircraft flight crew traffic advisories and resolution advisories for other aircraft within a selected horizontal range of the aircraft on a single electronic display face comprising the steps of:
   providing on the display face an indication of the aircraft;

displaying on the display face symbols indicative of the altitude and bearing of other aircraft within the selected horizontal range;

changing the symbols indicative of other aircraft within the selected range to highlight aircraft which constitute a collision threat;

providing around the periphery of the display face a vertical speed scale illuminated with light of a first color;

positioning an indicator with respect to the vertical speed scale to indicate the aircraft vertical speed; and, selectively illuminating a portion of the vertical speed scale, indicative of a range of vertical speeds which should be avoided, in a contrasting color to that of said first color, in response to a resolution advisory provided by a Traffic Advisory and Collision Avoidance System (TCAS) computer aboard the aircraft.

15. A method as claimed in claim 14, further comprising the step of:

displaying a symbol representing a particular resolution advisory.

16. A method as claimed in claim 14 further comprising: providing around the indication of the aircraft, fixed range markings intermediate said aircraft indication and the selected horizontal range.

17. A method as claimed in claim 14 wherein the range of the vertical speeds to be avoided is illuminated red.

* * * * *